United States Patent
Zoretich et al.

[19]

[11] Patent Number: 6,125,955
[45] Date of Patent: Oct. 3, 2000

[54] MAGNETIC WHEEL

[75] Inventors: Carl Zoretich, Duluth; Daniel Garman, Evelth, both of Minn.

[73] Assignee: Aqua Dynamics, Inc., Evelth, Minn.

[21] Appl. No.: 09/266,368

[22] Filed: Mar. 11, 1999

[51] Int. Cl.⁷ .............................. B62D 57/00; B60B 9/10; B60B 9/00

[52] U.S. Cl. ................... 180/7.1; 152/77; 152/44; 152/47

[58] Field of Search ................... 152/17, 40, 44, 152/47; 180/7.1, 21, 235, 901, 124.111; 301/5.1

[56] References Cited

U.S. PATENT DOCUMENTS

| | | | |
|---|---|---|---|
| 1,289,936 | 12/1918 | Seidel | 152/40 |
| 1,651,009 | 11/1927 | White | 152/40 |
| 1,711,819 | 5/1929 | White | 152/40 |
| 2,030,840 | 2/1936 | Allen | 91/18 |
| 2,246,651 | 6/1941 | Williams | 152/40 |
| 2,694,164 | 11/1954 | Geppelt | 152/40 |
| 3,465,804 | 9/1969 | Dupre | 152/40 |
| 3,682,265 | 8/1972 | Hiraoka et al. | 180/9.2 R |
| 3,690,393 | 9/1972 | Guy | 180/1 |
| 3,719,395 | 3/1973 | Mulasmajic | 152/40 |
| 3,734,565 | 5/1973 | Mulasmajic | 152/40 |
| 3,777,834 | 12/1973 | Hiaoka et al. | 180/9.44 |
| 4,890,567 | 1/1990 | Caduff | 114/222 |
| 5,104,201 | 4/1992 | Ross | 152/47 |
| 5,285,601 | 2/1994 | Watkin et al. | 51/430 |
| 5,355,807 | 10/1994 | Pelrine et al. | 180/901 |
| 5,372,170 | 12/1994 | Hynes | 152/42 |
| 5,853,655 | 12/1998 | Baker | 266/44 |
| 6,000,484 | 12/1999 | Zoretich et al. | 180/7.1 |

*Primary Examiner*—Lanna Mai
*Assistant Examiner*—Jeffrey J. Restifo
*Attorney, Agent, or Firm*—D. L. Tschida

[57] ABSTRACT

An improved magnetic wheel for a vehicle that moves over ferromagnetic surfaces. The vehicle includes an articulating, remotely controlled chassis that is constructed around a variable frequency motor. Drive axles extend from spring biased torsion hubs and are supported at resilient bushings at each wheel. Each wheel includes a number of adjoining annular permanent magnet pole sets. Permanent magnet disks are arrayed around the circumference of each pole set. At least one pole set is secured to a wheel hub and the others are supported from resiliently mounted registration pins. The resiliently mounted pole sets are able to flex with encountered irregularities at the work surface as the axle tracks and independently flexes with the surface changes.

20 Claims, 7 Drawing Sheets

MAGNETIC WHEEL

BACKGROUND OF THE INVENTION

The present invention relates to vehicles having magnetic drives for conveying a variety of tool heads over a ferromagnetic surface. A laminated magnetic wheel is particularly shown that has groups of annular magnetic pole sets that define a rolling surface and which pole sets are resiliently mounted to flex at surface irregularities and discontinuities without disrupting wheel contact.

Maintenance on a variety of structural, ferromagnetic metal surfaces, such as found in ships, storage tanks, silos and smokestacks, is normally performed after a system of scaffolds and other work supports are erected. The manual setup and maintenance operations require 1 are typically very time consuming and costly due to the involved manual labor.

Varieties of magnetic vehicles fitted with appropriate tool heads have been developed to perform these tasks. Such vehicles can reduce the man-hours. Examples of various track vehicles are shown a U.S. Pat. Nos. 3,682,265; 3,777,834; 3,960,229; 4,789,037; 4,890,567; and 5,285,601 and Japanese patent 62-12482.

The tracks of the foregoing vehicles either contain a series of electromagnets or permanent magnets that are mounted to the vehicle tracks or to the vehicle chassis. Where the magnets are mounted to the tracks, the magnets rotate with the tracks to progressively engage and disengage the work surface. A number of magnet elements are thereby always in contact with the work surface, while others are not.

Track drive assemblies, however, are costly and physically heavy. The extra weight necessitates additional holding power. The added costs limit the economic advantages. The maneuverability of track vehicles is also limited by the speed and braking controls necessary to properly steer and maneuver the separate tracks. Track drives also have difficulty in maintaining contact with work surfaces exhibiting tight surface curvatures, surface irregularities (e.g. rivets, welds or other discontinuities or disruptions) or containing rust, dirt or other surface residue or contaminants.

Wheeled magnetic vehicles are also known and examples are shown at U.S. Pat. Nos. 2,030,840; 2,694,164; 3,690,393; 3,734,565; and 5,355,807. Maintaining surface is especially important with wheels. The relatively small area of tangential contact of each wheel with the surface particularly limits the holding power of each wheel. Surface contact is also lost or restricted to a small area when discontinuities or irregularities are encountered.

The magnetic wheel of the subject invention was developed to overcome the foregoing shortcomings. The wheel provides laminated groups of annular magnetic pole sets. Each pole set supports a number of magnetic pole pieces. The pole sets are resiliently supported at each wheel to permit one or more pole sets to vertically flex upon encountering surface irregularities. An optimal number of magnetic pole sets are thereby able to maintain contact with the work surface during traversal of the surface. Independent, resilient suspensions separately support each of the wheels to the vehicle chassis to further optimize wheel contact with the surface.

SUMMARY OF THE INVENTION

It is accordingly a primary object of the invention to provide a vehicle having a magnetic drive wherein a number of permanent magnet wheels support the vehicle to a ferromagnetic surface.

It is a further object of the invention to provide magnetic wheeled vehicle that is capable of supporting a variety of tool heads and wherein the attractive force of the wheels supports the vehicle weight and repulsive working forces generated at the tool head.

It is a further object of the invention to provide permanent magnet wheels that are constructed of a number of stacked or laminated pole sets and each of which pole sets contains a number of magnetic pole pieces.

It is a further object of the invention to provide pole sets wherein annular keepers contain a number of magnetic disks distributed around the circumference of the keepers.

It is a further object of the invention to provide a magnetic wheel having one or more stationary pole sets mounted to a wheel hub and to which stationary pole sets other pole sets are mounted to resiliently flex with surface irregularities, without disrupting contact between the other pole sets and the ferromagnetic surface.

It is a further object of the invention to provide a magnetic wheel wherein at least one pole set is secured to a center hub and a number of adjoining pole sets are able to rise and fall upon encountering surface irregularities and discontinuities.

It is a further object of the invention to provide a magnetic wheel constructed from a number of groups of pole sets and wherein each group includes a pair of pole sets that are pinned to an intermediate pole set and wherein the pin retainer is mounted in elastomer bushings at the adjoining pole sets.

It is a further object of the invention to provide a resilient wheel support assembly having roller bearings that rotate and stabilize the lateral periphery of each magnetic wheel and upper and lower, non-abrasive, resilient pad assemblies that stabilize vertical flexion of each magnetic wheel.

Various of the foregoing objects, advantages and distinctions of the invention are obtained in a magnetic wheel that is constructed of groups of annular magnetic pole sets. Each pole set supports a number of magnetic disks or pole pieces between and around the circumference of mating annular keepers. The pole sets of each group are secured together with retainer pins that extend between the pole sets. The pins are supported in resilient bushings or grommets. Repelling poles of the disks are aligned to one another at the adjacent pole sets, such that each pole set is able to vertically flex relative to its neighboring pole sets. At least one pole set of each group is secured to a wheel hub.

In one presently preferred wheel construction, two groups of three pole sets are mounted in side by side registry at each wheel. One pole set of each group is rigidly secured to the wheel hub. A number of pins laterally extend at equal intervals from solid pin retainers at the center pole set of each group and are supported at elastomer bushings in pin retainers at the adjacent pole sets. Two pole sets of each group are thereby able to flex upon encountering surface irregularities and discontinuities.

The permanent magnet wheels are fitted to independent live axles at the vehicle chassis. Each axle is separately secured to a resilient bushing at the wheel hub to permit the flexing of each wheel at its supporting axle. Rigid shims at each wheel substantially restrict wheel flexion to a vertical axis normal to a rolling or working surface.

An alternative wheel support assembly provides a universal joint coupling between each wheel and the gear reduction drives. Roller bearings fitted to axles that laterally extend from an axle tube stabilize the lateral periphery of each magnetic wheel. Upper and lower housings are also secured to the axle tubes and each contains a nonabrasive control pad that stabilizes the wheel against vertical flexion. Elastomer compression pads of a desired resilience cooperate with the control pads to determine the counteracting resistance.

Fore and aft pairs of axles are supported to gear reduction drives and torsion spring hubs that extend from forward and aft sections of the drive motor. Drive power is transferred to the gear drives through flexible (e.g. U-joint) couplers. The chassis sections articulate about resilient pivots. A remotely operated servo controlled screw follower steering linkage steers the fore and aft sections.

Still other objects, advantages and distinctions of the invention will become more apparent from the following description with respect to the appended drawings. Similar components and assemblies in the various drawings are referred to with similar alphanumeric characters. The description should not be literally construed in limitation of the invention. Rather, the invention should be interpreted within the broad scope of the further appended claims.

DESCRIPTION OF THE PREFERRED EMBODIMENT

Figure 1:
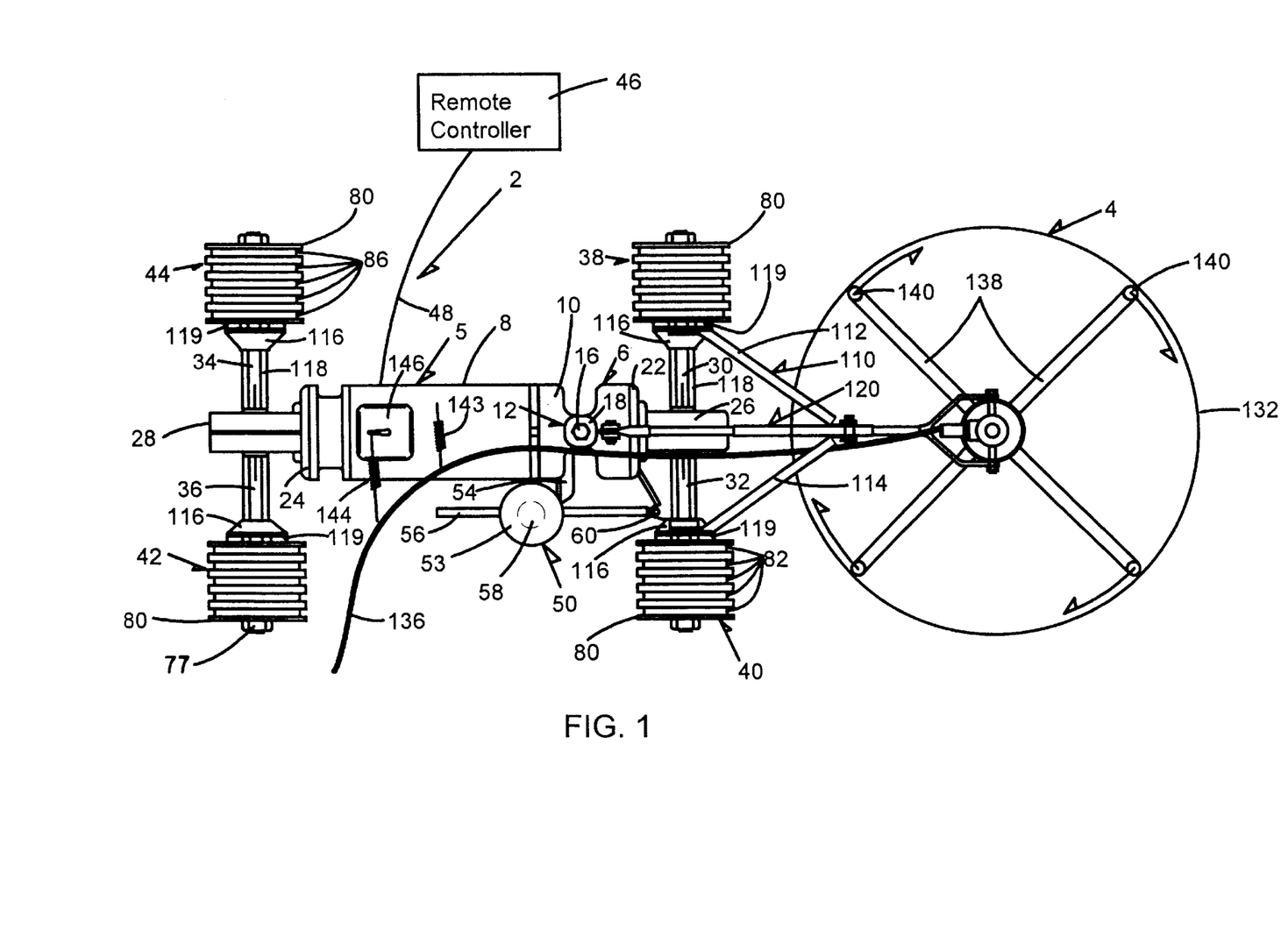
FIG. 1 is a top plan view of a vehicle supported from a number of permanent magnet wheels.
Figure 2:
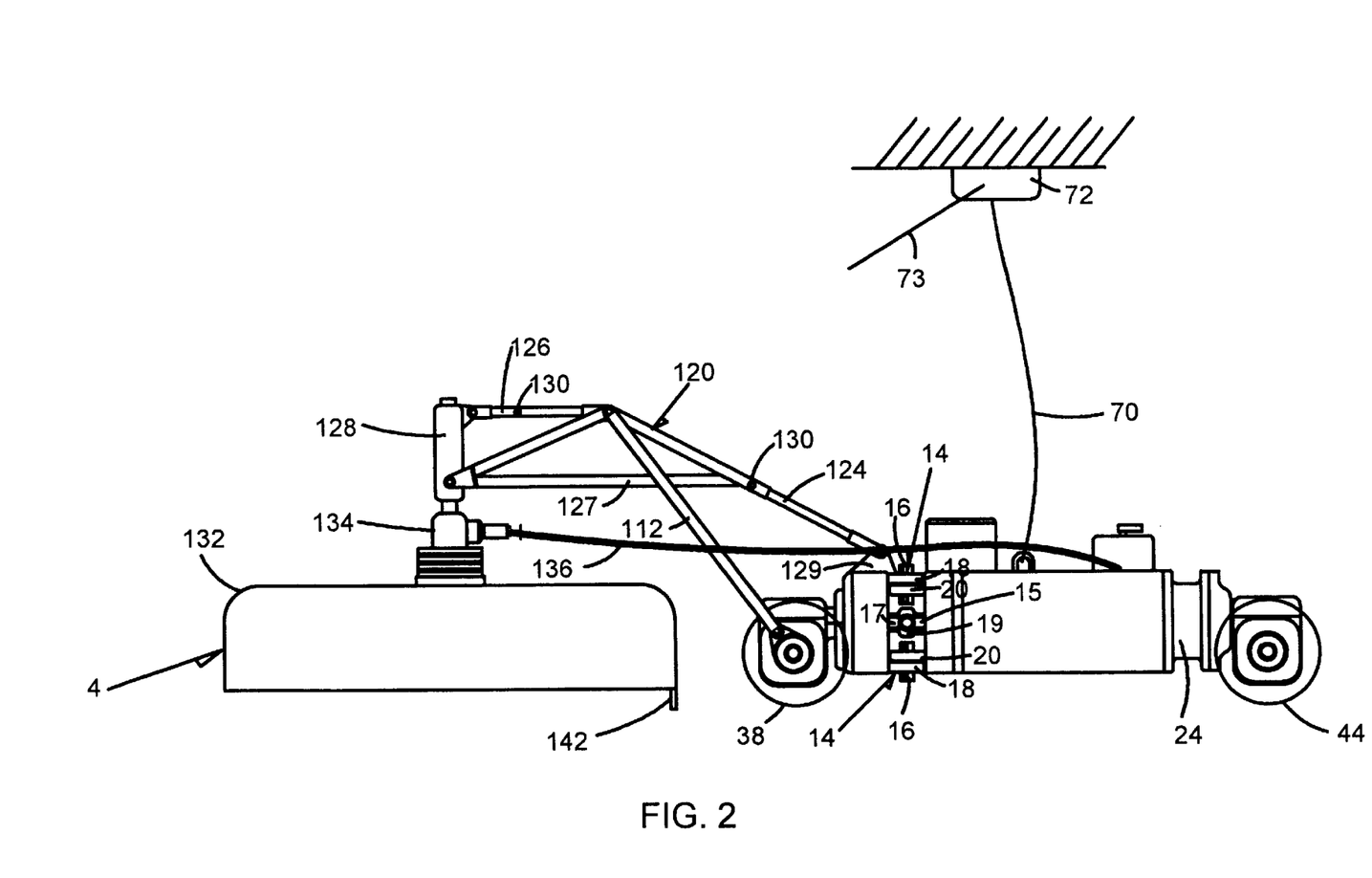
FIG. 2 is a side view of the vehicle of FIG. 1.

Referring to FIGS. 1 and 2, top and side views are shown to a wheeled permanent magnet vehicle 2 that supports a high pressure liquid spray head 4. The vehicle 2 provides independent, articulating aft and forward chassis sections 5 and 6. The aft chassis section 5 is constructed around the housing 8 of a frequency controlled motor 10.

The chassis sections 5 and 6 are secured together at upper and lower pivot joints 12 and 14, reference FIG. 2. Pivot pins 16 secure mating couplers 18 and 20 at each of the joints 12 and 14. The pivot pins 16 mount through resilient flexible bushings (i.e. elastomer or rubber etc.) fitted to bores at the mating couplers 18 and 20. The bushings permit a freedom of motion at the pivot joints 12 and 14 that allows the chassis sections 5 and 6 to follow and accommodate elevation changes at working surfaces that are not uniformly smooth. Although one type of pivot joints 12 and 14 are shown, a variety of resilient pivots, including U-joints and cable joints, can alternatively be incorporated into the vehicle 2.

Mounted to fore and aft ends of the housing 8 are torsion hubs 22 and 24. Springs mounted within shells of the torsion hubs 22 and 24 permit the shells to rotate relative to each other under a spring bias. The torsion hubs 22 and 24 mate with gear reduction drives 26 and 28. An output shaft 15 that extends from the opposite ends of the motor 10 is coupled to input shafts 17 at each of the gear reduction drives 26 and 28. The shafts 15 and 17 are particularly coupled with U-joints 19 and one of which is shown in FIG. 2 at the torsion hub 22.

A number of half-axles 30, 32, 34 and 36 having geared ends are coupled to the gear reduction drives 26 and 28 and terminate at a number of permanent magnet wheels 38, 40, 42 and 44. The coupling of the reduction drives 26 and 28 and axles 30, 32 and 34, 36 to the torsion hubs 22 and 24 permits the axles 30–36 to track changes in surface contours. That is, a shell of each torsion hub 22 and 24 that mounts to one of the reduction drives 26 or 28 can rotate under a spring bias and permit the axles 30–36 to rise and fall relative to the work surface to maintain contact.

Figure 6:
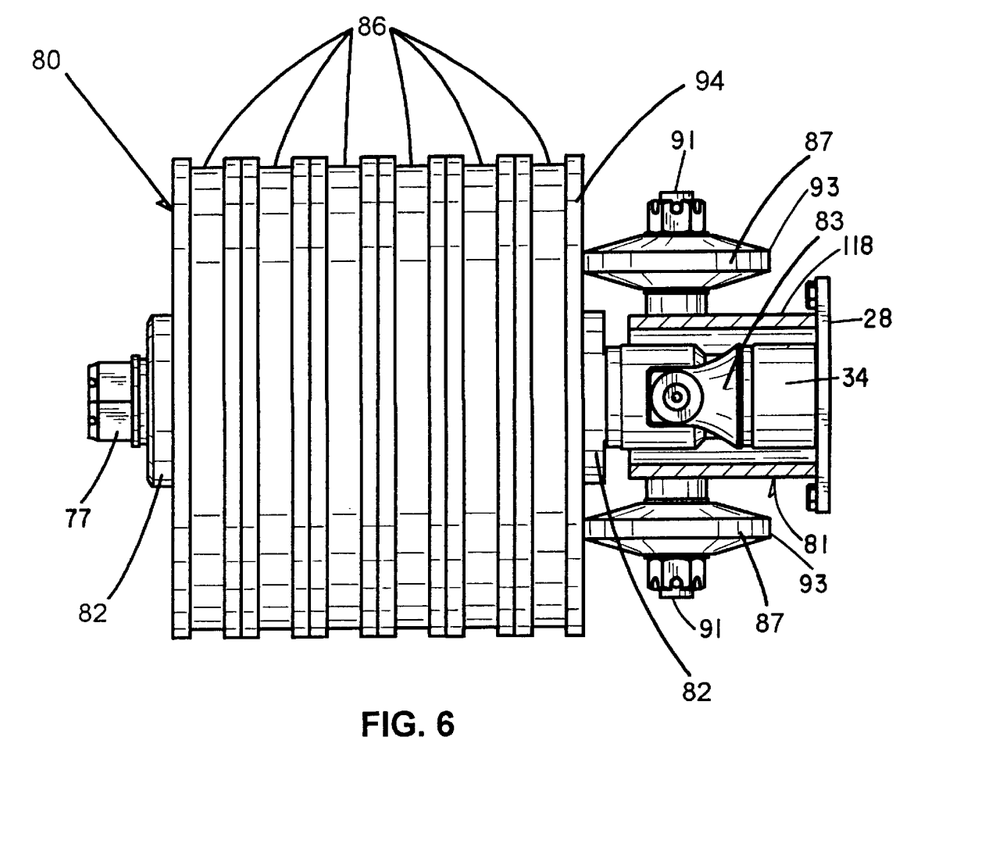
FIG. 6 is a top view of an alternative wheel support assembly with an upper flexion control assembly removed and a portion of the axle tube cutaway to expose a universal joint coupler.
Figure 7:
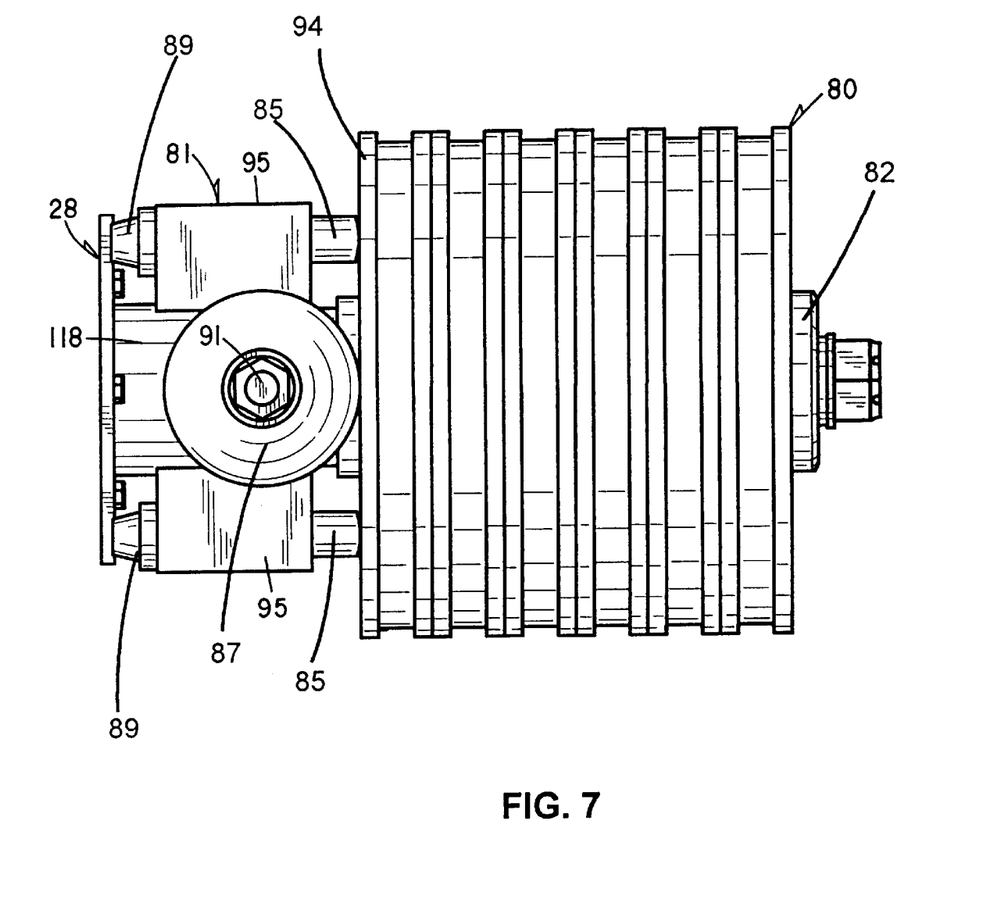
FIG. 7 is a side view of the wheel support assembly of FIG. 6 showing the upper and lower flexion control assemblies and roller bearing supports.

The construction of a wheel 80 that can be used at any of the wheels 38–44 is discussed below with respect to FIGS. 3–5. The wheel 80 provides a resilient or flexible rolling surface that can improve the operating performance of the wheels 38–44. FIG. 1 depicts the vehicle 2 outfitted with four of the wheels 80. A resilient bushing 84 at each wheel 80 permits each wheel 80 to flex with respect to its associated axle, reference FIG. 4. FIGS. 6 and 7 show an alternative wheel support assembly.

The gear reduction drives 26 and 28 presently provide a conversion ratio of approximately 150:1. That is, for a nominal motor speed of 900 rpms, the wheels 38–44 are driven at approximately 6 rpms. A corresponding vehicle speed is obtained that is sufficient for a liquid spray head 4 to adequately clean the interior walls of an oil storage tank. As necessary, multiple passes can be performed over especially gritty areas.

Pulsed drive signals are supplied to the motor 10 from a conventional remote controller 46. A multi-conductor cable 48 couples the controller 46 to the motor 10. Line conductors L1 and L2 in the cable 48 are switched at relay contacts B1 and B2 (not shown). The controller 46 includes separate start-stop, direction and speed control circuitry. A wireless, RF controller having similar functional controls may be substituted for the controller 46. A headlight can also be mounted to the vehicle 2 and controlled from the controller 46.

The chassis section 6 is steered relative to the aft chassis section 5 with a steering assembly 50. A bracket 52 of the assembly 50 mounts extends from the gear reduction drive 26 and axle 32. A servomotor 53 is secured to the housing 8 at a second bracket 54. A threaded screw follower steering arm 56 is coupled to a complementary screw drive head 58 (shown in dashed line) at the bottom of the servomotor 53 and a pin coupler 60 secures the arm 56 to the bracket 52. Rotation of the drive head 58 extends and retracts the arm 56 a plus or minus 3 inches, which provides a sufficient turning radius for the vehicle 2.

The operating range of the arm 56 can be adjusted relative to the dimensions of the frame sections 5 and 6 to provide a sufficient turning radius. An exemplary turning radius in the range of 10 to 45 degrees at the wheels 38 and 40 is believed sufficient for most tasks. The turning radius should be sufficient to permit lateral adjustment of the vehicle 2 at least the width of the cleaning path.

The turning radius of the vehicle 2 provides a relatively wide range of adjustment versus that obtained with track vehicles. The steering adjustments are also made more smoothly and in shorter distances than with track vehicles.

Supported to the forward chassis 6 from a framework 110 is the spray head 4. A pair of wing arms 112 and 114 extend from a pair of collars 116 that are mounted to a sleeve or axle tube 118 at the axle 30 and to the bracket 52. The wing arms 112 and 114 mount to a telescoping center column 120. Similar collars 116 and sleeves 118 are fitted to the aft axles 34 and 36.

When the wheels 80 are used with the vehicle 2, a number of solid, nonmagnetic shims 119 are fitted between the collars 116 at each of the wheels 38–44 to limit and reduce any lateral flexion of the wheels 38–44. Wheel flexion is possible due to the presence of the resilient bushings 84 that mount between each axle 30–36 and each wheel 38–44. Potential slippage at the wheels 38–44, during turning, is also reduced.

The column 120 is constructed of a number of telescoping sections 122, 124 and 126 that extend between a collar 128 and a bracket 129 at the hub 22. A cross brace 127 extends between the section 122 and collar 128. Set screws 130 fix the relative extensions of the column sections 122, 124 and 126. The orientation and displacement of a circular shroud 132 at the spray head 4 relative to the work surface being cleaned is thereby established. The proper orientation of the shroud 132 is normally established with the initial setup and fitting of the vehicle 2 to a work surface. Hydraulic or electronic actuators can be used in lieu of set screws 30 to provide controlled, automatic adjustments.

A manifold 134 depends from the collar 128 and a liquid supply line 136 is coupled to the manifold 134. Four spray arms 138 rotate about the manifold 134 beneath the shroud 132. Spray orifices or jets 140 are secured to the arms 138 and provide a cleaning pressure of between 5,000 to 30,000 psi. Such pressures are sufficient to clean thick sludge, scale, paint and the like from a variety of metallic surfaces.

A squeegee 142 fitted to the shroud 132 removes flaked debris. The wheels 38–44 thereby cannot become clogged or coated. The height of the squeegee 142 is adjustable to facilitate the removal of debris without effecting the contact between the vehicle 2 and metal surface. Although the spray head 4 is shown mounted to the forward chassis section 6, the head 4 can be mounted to the aft chassis section 5. In all cases, the head 4 preferably precedes the motor 10 to assure a clean running surface for the wheels 38–44. The initial starting area is typically hand scraped.

The liquid supply line 136 is supported to the motor housing 8 at a primary safety spring 143, for example, having a 30 pounds spring force. A secondary spring 144, for example, having a 5 pound spring force and associated switch 146 cooperate with the spring 143 to cut pressure to the line 136 and drive power to the motor 10. The cooperation of the springs 143 and 144 prevent vehicle damage in the event snags or restrictions occur at the cabling 48 and conduit 136 etc. More of the details to the vehicle 2 are described at applicant's co-pending U.S. patent application Ser. No. 08/719,993, which is incorporated by reference herein.

Figure 3:
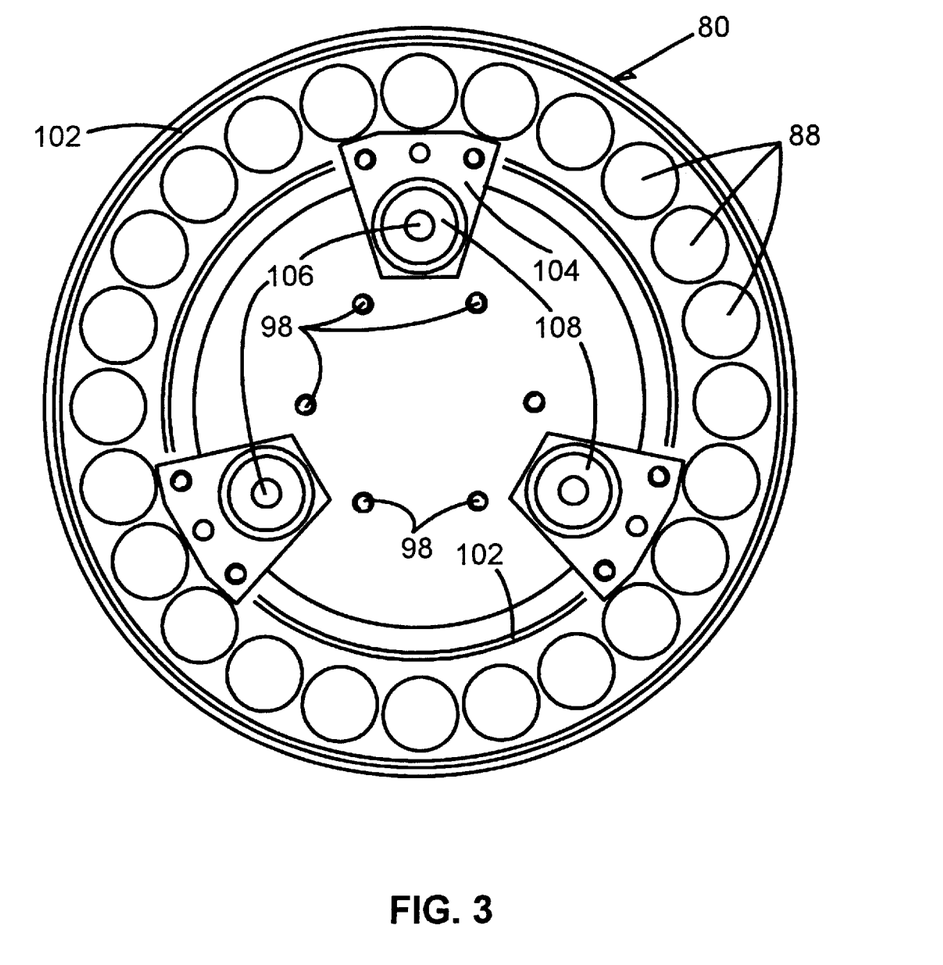
FIG. 3 is a front plan view of an improved magnetic wheel.
Figure 4:
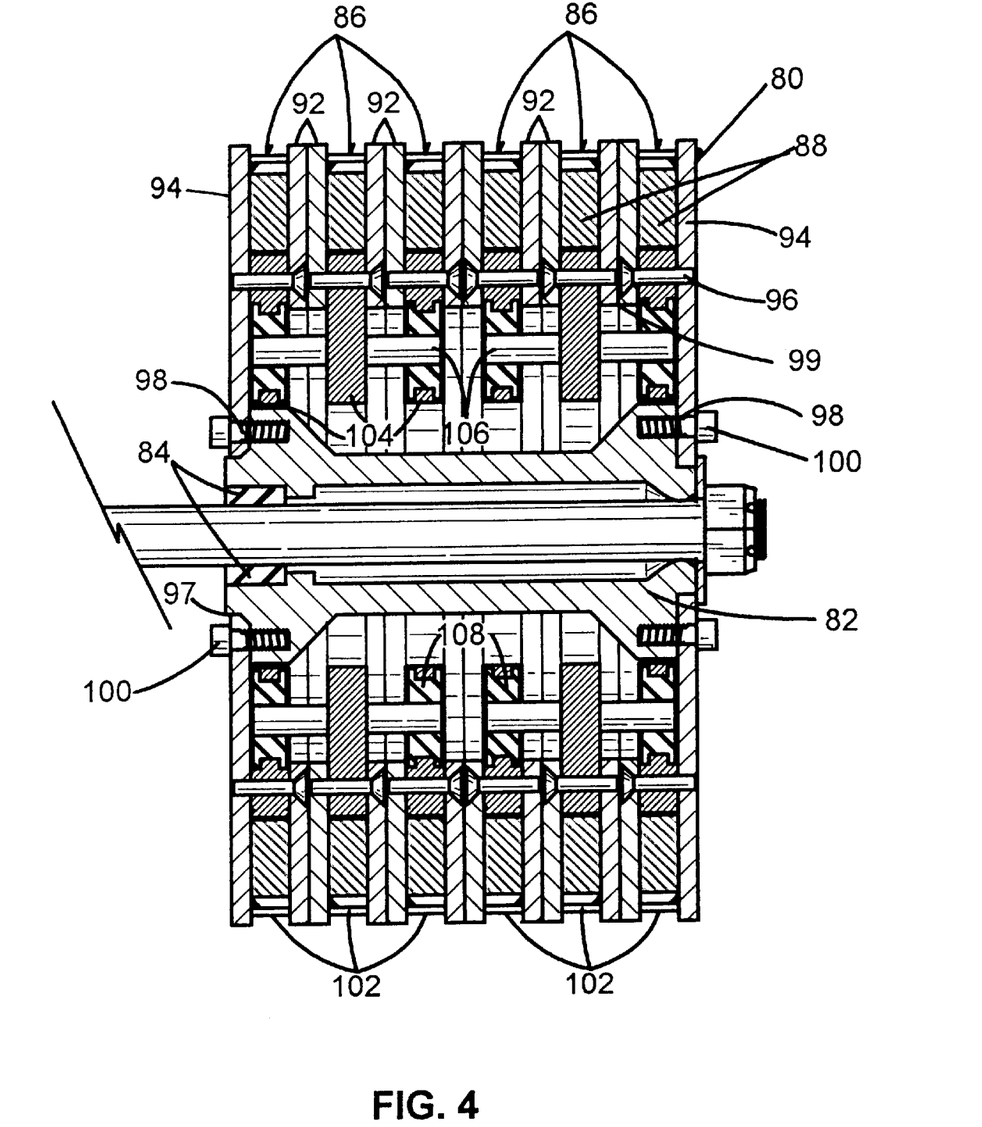
FIG. 4 is a cross section view through a wheel taken along the axle.
Figure 5:
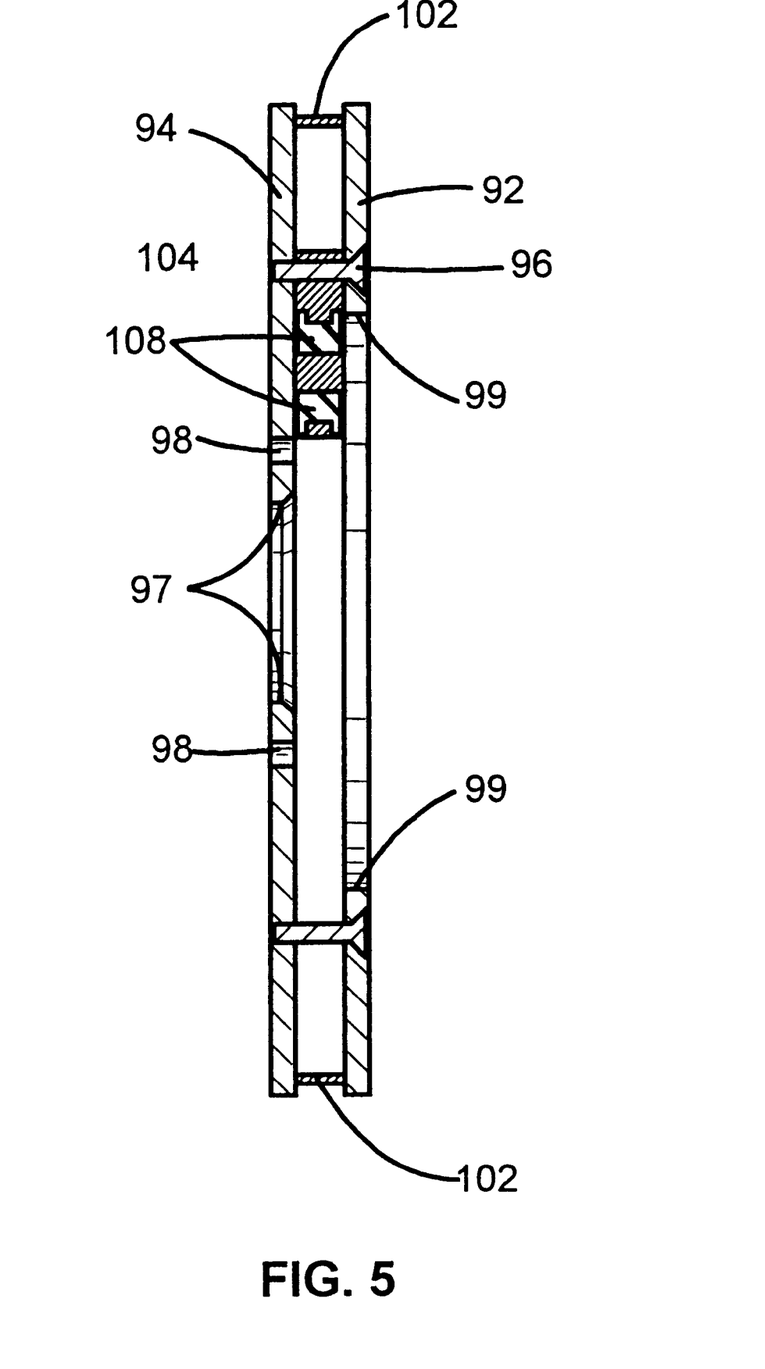
FIG. 5 is a cross section view taken through an assembled magnetic pole piece keeper.

With additional attention to FIGS. 3, 4 and 5, details are shown to the construction of the magnetic wheel 80 that can be used at any or all of the vehicle wheels 38–44 to improve contact with irregular work surfaces. A hub 82 of each wheel 80 includes a resilient bushing 84. The bushing 84 can be constructed of a variety of materials to exhibit a desired durometer and flexion characteristic. Each of the axles 30–36 mounts through the bushing 84 and is secured to the hub 82 with an end nut 77. The bushings 84, shims 119 and torsion hubs 26 and 28 permit each wheel and axle to rise and fall and flex with surface irregularities. Provided the irregularities span a substantial portion of the wheel, each wheel is able to maintain contact with the ferromagnetic work surface.

The wheel 80, however, also accommodates contour changes, discontinuities or irregularities in the work surface that are narrower than the wheel's rolling surface. The rolling surface of the wheel 80 is particularly designed to flex with such irregularities and the details of which are described below. The rolling surface of the wheel 80 essentially deforms to absorb any encountered irregularity without loosing surface contact. Conventional wheels, otherwise, provide rigid rolling surfaces that can separate from the work surface as the rolling surface of a wheel encounters irregularities and contour changes. The strength of the magnetic coupling between each wheel and the work surface can be effected to the point where the vehicle detaches from the work surface.

Although the wheels 80 are designed to prevent loss of surface contact, a safety tether 70 and anchor 72 are provided to catch the vehicle 2, reference FIG. 2, if contact is lost. The anchor 72 may comprise a tie-off hook or a magnet that is sized to withstand the weight of the vehicle 2 and any shock forces upon reaching the end of the tether 70. A lever arm or handle 73 at the anchor 72 facilitates movement of the anchor about the work surface. A variety of suction type devices may also be used to advantage at the anchor 72.

The wheels 80 provide enhanced surface contact through a number of resiliently mounted pole sets 86 at each wheel 80. Six pole sets 86 are mounted in two groups of three to each hub 82. Various of the pole sets 86 can rise and fall to accommodate irregularities that are narrower than the width or rolling surface of the wheel 80. In particular, the four interior pole sets 86 are resiliently supported to the hub 82 from adjoining stationary pole sets 86 at the left and right sides of the hub 82.

FIG. 3 depicts a front plan view to the improved wheel 80 and FIG. 4 depicts a cross section view through the wheel 80 and wherein the pole sets 86 are apparent. Each pole set 86 includes a number of cylindrical or disk shaped rare earth magnets 88. The magnets 88 are mounted and between a pair of mating annular keepers or pulls 92 and are arranged in a circle at or near the peripheral edge of the pole sets 86. A pair of keepers 94 at the right and left ends of the hub 82 have a smaller diameter center bore 97 and receive fasteners 100 that secure all of the pole sets 86 to the hub 82.

For a wheel 80 having a 10-inch diameter, twenty-four magnets 88 are mounted around the circumference of each set of keepers 92 and/or 94. In another 7½-inch diameter wheel 80, seventeen magnets 88 are used. The magnets 88 are 1 inch in diameter and ½ inch thick. The magnets 88 are formed from mixtures of rare earth materials, for example, neodymium with metallic powders. The keepers or pulls 92 and 94 are appropriately sized to contain the magnets 88 and concentrate the magnetic force of the magnets 88 at the peripheral edge or rolling surface of each pole set 86. The magnets 88 are typically set back from the peripheral edges of the keepers 92 and 94. The set back can be established in a range that typically does not exceed the thickness of the keeper 92 or 94. A typical range might be 0.01 to 0.5 inches. The specific set back will depend upon the application and a variety of other parameters discussed below.

The foregoing 10-inch diameter wheels 80 with a set back of 0.01 inch provide a nominal 300 to 500 pounds of holding power per wheel, depending upon the magnets 88 and various of the parameters discussed below. The 7½-inch wheel 80 exhibits a holding power of approximately 725 pounds. The increased support strength is speculated to derive from reduced core losses. The foregoing holding powers are sufficient to support the weight of the vehicle 2, the repulsive forces exerted by the spray head 4 and losses due to surface films or dirt and permit uninterrupted operation with a margin for safety.

Referring to FIGS. 4 and 5, the keepers 92 and 94 are constructed of ferromagnetic steel annular plates and are secured together with threaded screw fasteners 96. The keepers 94 are essentially identical to the keepers 92, except they have a smaller diameter center bore 97 versus the larger diameter bore 99 at the keepers 92. A number of holes 98 accept fasteners 100 that secure the keepers 94 to the hub 82. A stationary attachment is thus provided between the keepers 94 and the hub 82.

The keepers 94 and alternating ones of the interior keepers 92 include spacers 102 that are welded about the circumference of the keepers 92 and 94. The spacers 102 separate the pairs of keepers 92, 94 and 92, 92 from one another and retain the magnets 88 in proper alignment within each pole set 86. The spacers 102 are constructed as bands, although can take the form of pins or other devices that separate the keepers 92 and/or 94 and hold the magnets 88 in a proper arrangement.

The magnets 88 are also arranged at each pole set 86 such that repelling poles of the magnets 88 are aligned opposite each other at the adjacent pole sets 86. Each pole set 86 is thereby mounted to repel its neighbor and is thus able to move relative to its adjoining neighbor with relatively little friction. The repulsive forces essentially provide a magnetic lubricant to vertical movement of the adjoining pole sets 86.

The magnetic fields are tailored to concentrate the fields at the peripheral edges of the pulls or keepers 92 and 94 to optimize the retention of each wheel 80 to the work surface. The magnetic fields of each wheel 80 are tailored in relation to the thickness and type of work surface. The pole sets 86 are constructed to provide over saturated and cross-linked magnetic fields at the keepers 92 and 94. The attractive fields displayed at the peripheral edges of the keepers 92 and 94 to the ferromagnetic work surface are thereby greater than merely that which is displayed by the magnets 88 at each individual pole set 86 alone. The flexing of the pole sets 86 allows the wheels 80 to rotate with minimal disruption or loss of contact with the work surface the pole sets 86 and the interaction between the pole sets 86 collectively maintains sufficient transfer of attractive magnetic forces to prevent wheel detachment.

The repulsive and attractive fields are empirically determined by variously adjusting one or more of the following wheel parameters, among others: 1) the diameter, thickness and material of the keepers 92 and 94, 2) the diameter, thickness and material of the magnets 88, 3) the strength of the magnets 88, 4) the proximity of the magnets 88 to the peripheral edges of the keepers 92 and 94, 5) the arrangement of the magnets 88 between the keepers 92 and 94, 6) the numbers of pole sets 86, and 7) the alignment of the pole sets 86 to one another. In the latter regard, the magnets 88 of adjoining pole sets 86 can be rotated or offset such that each magnet 88 overlaps or aligns with more than one magnet 88 at the adjoining pole set 86.

Concentrically arrayed around each pole set 86 in the space between the bores 97 and 99 and magnets 88 are a number of pin holders 104. Three holders 104 are displaced equidistant from each other around each pole set 86. The pin holders 104 are formed from flat aluminum stock and each holder 104 supports a stainless steel, registration or retainer pin 106. The pins 106 couple three adjoining pole sets 86 together as a group. The pins 106 are mounted such that three of the pole sets 86 are secured as one group to the right keeper 94 and the other three are secured as a group to the left keeper 94. The holders 104 are secured to the mating pairs of keepers 92 and 94 of each pole set 86 with fasteners 96.

Each pin 106 is centered at a solid holder 104 at the center pole set 86 of each group. The ends of the pins 106 are supported at an elastomer or rubber grommet 108 mounted to the holders 104 of the adjoining pole sets 86 of each group. The interior pole set 86 of each group thereby supports the adjoining pole sets 86. The two interior pole sets 86, not coupled to the keepers 94, are thus able to rise and fall as the rolling surface of the wheel 80 encounters irregularities in the work surface. The flexion of the rolling surface of the wheel 80 maintains the magnetic attachment and prevents dislodgment of the vehicle 2.

It is to be appreciated the magnetic force of each wheel 80 can be adjusted by varying the numbers and construction of the pole sets 86 to accommodate different tool heads and work surfaces. The number of pole sets 86 in each group can be varied or additional groups of pole sets 86 can be secured to each wheel 80. Additional pins 106 can also be added or positioned such that a number of pole sets 86 can flex in unison as a group. The size of the wheels 80 used at the wheels 38–44 can also be varied.

Collectively, the articulation of the aft and forward chassis sections 5 and 6; the suspension of the half-axles 30–36 to the torsion hubs 22 and 24; the suspension of the axles 30–36 in the bushings 84; and the flexible suspension of the pole sets 86 permit the vehicle 2 to negotiate typically encountered surface irregularities without losing surface contact. The wheels 80 and vehicle 2 are particularly able to traverse surfaces containing surface films, sludge, rivets, discontinuities, seams, dents, tight curvatures and tapers, among other surface irregularities. The magnetic attraction is also sufficient to overcome the repulsive forces exerted by the tool head 4.

FIGS. 6 and 7 depict top and side views of an alternative wheel support assembly 81 to resiliently support each wheel to the vehicle 2. The assemblies 81 can be substituted for the bushings 84 and shims 119. The assemblies 81 provide a more positive steering control over the wheels 80 and eliminate wear experienced at the shims 119.

With attention to FIG. 6, an exemplary top view is shown in partial cutaway through an axle tube 118 to expose a universal joint coupler 83 between the reduction drive 28 and axle 34. A pair of stub axles 91 extend from the axle tube 118 and support a pair of roller guides 87. The roller guides 87 include a wheel 93 that is supported on a bushing or roller bearings (not shown). The wheels contact the lateral edges of the inner keeper 94 to laterally stabilize the wheel 80 as it rotates. An improved steering control at the vehicle 2 is thereby obtained.

FIG. 7 shows a side view to the wheel 80 of FIG. 6 and from which upper and lower flexion control assemblies 81 that are supported to the axle tube 118 are apparent. A body 95 of each assembly 81 is bolted to the tube 118. A control pad 85 and an elastomer, compression pad 89 project from opposite sides of the body 95 between the reduction drive 28 and wheel 80. The control pad 85 is formed from an abrasion resistant plastic and is normally supported with a clearance of 0.002 to 0.003 inches from the wheel 80. The pads 85 and 89 vertically stabilize the wheel 80. As the wheel 80 tips toward or away from the reduction drive 28 one of the pads contacts the wheel 80 and resiliently resists the motion.

The compression pad 89 is sized and fitted to the body 91 to accommodate the desired clearance. The pad 89 can be constructed from a variety of resilient materials or elastomers and is selected to withstand typical pressures of 20 to 120 pounds. The shape and size of the control and compression pads 85 and 89 can be varied.

While the invention has been described with respect to a preferred construction, still other constructions may be suggested to those skilled in the art. Presently considered modifications and improvements have also been discussed. The foregoing description should therefore not be strictly construed and rather should be interpreted to include all those embodiments within the spirit and scope of the following claims.

What is claimed is:

1. A magnetic wheel comprising:
    a) a hub having an axle bore; and
    b) a plurality of annular pole sets mounted to said hub in adjacent registry to one another, wherein peripheral edges of the plurality of pole sets define a rolling surface of said wheel, wherein each pole set includes a plurality of permanent magnets, and including means for resiliently supporting said plurality of pole sets to said hub such that at least one of said pole sets can move transverse to the rolling surface independent of the other pole sets, whereby said rolling surface can flex with encountered surface irregularities.

2. A wheel as set forth in claim 1 wherein each of said plurality of pole sets comprises first and second annular plates, a plurality of permanent magnets mounted between and around the circumference of said first and second plates, a plurality of holders mounted between said first and second plates and a plurality of pins that laterally project from said holders and extend to a plurality of holders at an adjoining pole set.

3. A wheel as set forth in claim 2 wherein a plurality of said holders each include a resilient bushing that supports one of said pins.

4. A wheel as set forth in claim 3 wherein a plurality of said pole sets are arranged in a group, wherein the group includes a pole set having a plurality of solid holders that each rigidly support one of said pins, and wherein said rigidly supported pins laterally project from the solid holders and mount to said resilient bushings at an adjacent pole set.

5. A wheel as set forth in claim 4 wherein each wheel comprises a plurality of groups of pole sets which groups are secured to one another and to said hub such that the pole sets of each group vertically flex independent of the other groups, and wherein said hub includes resilient coupler means for flexibly supporting said hub to an axle, whereby the wheel can flex relative to the axle to adjust to the work surface.

6. A wheel as set forth in claim 3 including a circular band that projects from the periphery of one of said first and second plates, wherein said permanent magnets abut said band, and wherein said holders are concentrically arranged adjacent said plurality of permanent magnets.

7. A wheel as set forth in claim 2 wherein the poles of the permanent magnets at each of the plurality of pole sets are arranged to repel any adjacent pole set, whereby a repulsive magnetic field between adjacent pole sets facilitates vertical motion of the pole sets.

8. A wheel as set forth in claim 1 wherein the poles of the permanent magnets at each of the plurality of pole sets are arranged to repel any adjacent pole set, whereby a repulsive magnetic field between adjacent pole sets facilitates vertical motion of the pole sets.

9. A wheel as set forth in claim 1 wherein said hub includes resilient coupler means for flexibly supporting said hub to an axle, whereby the wheel can flex relative to the axle to adjust to the work surface.

10. A wheel as set forth in claim 1 including coupler means for flexibly supporting said hub to an axle, wherein said coupler means includes roller means mounted to support peripheral edges of said wheel and flexion means mounted to resiliently resist flexion of said wheel toward or away from an axle support.

11. A magnetic wheel comprising:
    a) a hub having an axle bore; and
    b) a plurality of annular pole sets mounted to said hub in lateral registry to one another, wherein circumferential peripheral edges of the plurality of pole sets define a rolling surface of said wheel, wherein at least one of said pole sets is mounted to said hub, wherein each pole set comprises first and second annular plates and spacer means for displacing said first and second plates from one another and supporting a plurality of permanent magnets and a plurality of holders between said first and second plates, wherein a plurality of pins laterally project from said plurality of holders, and wherein a plurality of said holders include a resilient bushing which supports one of said pins, whereby at least one of said pole sets can flex transverse to the rolling surface with encountered surface irregularities.

12. A wheel as set forth in claim 11 wherein the poles of the permanent magnets at each of the plurality of pole sets are arranged to repel any adjacent pole set, whereby a repulsive magnetic field between adjacent pole sets facilitates transverse motion of the pole sets.

13. A wheel as set forth in claim 11 wherein said spacer means comprises a circular band that projects from the periphery of one of said first and second plates, wherein said permanent magnets abut said band, and wherein said holders are concentrically arranged adjacent said plurality of permanent magnets.

14. A wheel as set forth in claim 11 wherein a plurality of said pole sets are arranged in groups, wherein each group includes a pole set including a plurality of solid holders and wherein said solid holders each rigidly support a pin, and wherein said pin laterally projects from the holder and mounts to said resilient bushings at a pair of adjacent pole sets.

15. A magnetic wheel comprising:
    a) a hub having an axle bore; and
    b) a plurality of annular pole sets mounted to said hub in lateral registry to one another to define a rolling surface of said wheel, wherein at least one of said pole sets is mounted to said hub, wherein each pole set comprises first and second annular plates and spacer means for displacing said first and second plates from one another and supporting a plurality of permanent magnets and a plurality of holders between said first and second plates, wherein repelling poles of the permanent magnets at adjacent pole sets are mounted opposite one another, wherein a plurality of pins laterally extend from said holders, and wherein a plurality of said holders include a resilient bushing which supports one of said pins, whereby a plurality of pole sets can flex transverse to the rolling surface with encountered surface irregularities.

16. A wheel as set forth in claim 15 wherein a plurality of said pole sets are arranged in groups and one pole set of each group is secured to said hub, wherein each group includes a pole set including a plurality of solid holders and wherein said solid holders each rigidly support a pin, and wherein said pin laterally projects from the holder and mounts to said resilient bushings at a pair of adjacent pole sets.

17. A magnetic vehicle comprising:

a) a chassis including a drive motor and a plurality of axles that support a plurality of wheels, wherein each wheel comprises a plurality of annular pole sets mounted to a hub in adjacent registry to one another, wherein circumferential peripheral edges of the plurality of pole sets define a rolling surface of said wheel, wherein each pole set includes a plurality of permanent magnets, and including means for resiliently supporting said plurality of pole sets to said hub such that at least one of said pole sets can move transverse to the rolling surface independent of the others, whereby said rolling surface can flex with encountered surface irregularities;

b) suspension comprising first and second torsion means for resiliently biasing said plurality of axles; and c) steering means for directing said chassis.

18. A vehicle as set forth in claim 17 wherein each of said plurality of pole sets comprises first and second annular plates, a plurality of permanent magnets mounted between and around the circumference of said first and second plates, a plurality of holders mounted between said first and second plates and a plurality of pins that laterally project from said holders and extend to a plurality of holders at an adjoining pole set.

19. A vehicle as set forth in claim 17 wherein a plurality of said pole sets are arranged in groups and one pole set of each group is secured to said hub, wherein each group includes a pole set including a plurality of solid holders and wherein said solid holders each rigidly support a pin, and wherein said pin laterally projects from the holder and mounts to said resilient bushings at a pair of adjacent pole sets.

20. A vehicle as set forth in claim 17 including coupler means for flexibly supporting each wheel to one of said axles, whereby each wheel can flex relative to the axle and independent of the rolling surface.

* * * * *